United States Patent
Onishi et al.

(10) Patent No.: US 8,381,605 B2
(45) Date of Patent: Feb. 26, 2013

(54) DISC DEVICE

(75) Inventors: Akihito Onishi, Tokyo (JP); Takaharu Eguchi, Tokyo (JP); Yoshifumi Awakura, Tokyo (JP); Tatsunori Fujiwara, Tokyo (JP); Akinori Tsukaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 289 days.

(21) Appl. No.: 13/001,633

(22) PCT Filed: Jul. 13, 2009

(86) PCT No.: PCT/JP2009/003268
§ 371 (c)(1),
(2), (4) Date: Dec. 28, 2010

(87) PCT Pub. No.: WO2010/026694
PCT Pub. Date: Mar. 11, 2010

(65) Prior Publication Data
US 2011/0100142 A1 May 5, 2011

(30) Foreign Application Priority Data
Sep. 2, 2008 (JP) ................................. 2008-225266

(51) Int. Cl.
*F16H 21/16* (2006.01)
*G11B 7/00* (2006.01)
*G11B 17/04* (2006.01)

(52) U.S. Cl. .......... 74/53; 720/664; 720/661; 360/99.07

(58) Field of Classification Search ........... 74/53, 89.26; 369/47.55, 176–271.1; 360/99.02, 99.06, 360/99.07; 720/607, 608, 664, 661
See application file for complete search history.

(56) References Cited

U.S. PATENT DOCUMENTS

| 5,025,332 | A | * | 6/1991 | Tsuchida et al. ................ 360/85 |
| 5,737,285 | A | * | 4/1998 | Uchiyama .................. 369/30.32 |
| 5,774,442 | A | * | 6/1998 | Nakamichi .................... 720/620 |
| 5,956,300 | A | * | 9/1999 | Chigasaki .................. 369/30.32 |
| 5,987,001 | A | * | 11/1999 | Ishioka et al. ............. 369/30.93 |
| 6,141,314 | A | * | 10/2000 | Umesaki et al. ........... 369/30.92 |
| 6,625,104 | B2 | * | 9/2003 | Michimori et al. ........... 720/641 |
| 7,287,263 | B2 | * | 10/2007 | Abe .............................. 720/661 |
| 8,196,487 | B2 | * | 6/2012 | Bless et al. ..................... 74/437 |
| 2003/0002421 | A1 | * | 1/2003 | Ming-Hui et al. ........... 369/77.1 |

(Continued)

FOREIGN PATENT DOCUMENTS
DE   10 2005 028676 A1   6/2006
JP       11-283311 A     10/1999
(Continued)

*Primary Examiner* — Troy Chambers
*Assistant Examiner* — Valentin Craciun
(74) *Attorney, Agent, or Firm* — Birch, Stewart, Kolasch & Birch, LLP

(57) ABSTRACT

A disc device has a sliding member 16 that operates in response to a rotational force of the first partially toothless gear 13 to disconnect a power transmission system from a disc conveying roller, and a protruding portion 16a disposed on this sliding member 16 is brought into contact with a rising portion 17b of a rotary lever 17 at an initial position of the sliding member before the sliding member starts operating, so as to restrict a rotation of the rotary lever 17 in such a way that a pin 17a does not come into contact with a wall surface of a cam groove 13d.

2 Claims, 6 Drawing Sheets

U.S. PATENT DOCUMENTS

| | | | |
|---|---|---|---|
| 2003/0016593 A1* | 1/2003 | Nagasaka et al. | 369/30.85 |
| 2003/0016594 A1* | 1/2003 | Nagasaka et al. | 369/30.85 |
| 2003/0185132 A1* | 10/2003 | Ariyoshi | 369/75.2 |
| 2004/0117808 A1* | 6/2004 | Tuchiya | 720/619 |
| 2004/0136311 A1* | 7/2004 | Nakamura et al. | 369/176 |

FOREIGN PATENT DOCUMENTS

| | | |
|---|---|---|
| JP | 2004-127336 A | 4/2004 |
| JP | 2005-259261 A | 9/2005 |
| JP | 2006-127615 A | 5/2006 |

\* cited by examiner

DISC DEVICE

FIELD OF THE INVENTION

The present invention relates to a disc device that carries out disc conveying and pickup feeding by using a single power source.

BACKGROUND OF THE INVENTION

This type of disc device has a mechanism of rotating a rotary lever by using a cam gear, and a fixed spring load is always imposed on this rotary lever by an elastic member. A sliding pin which comes into contact with a cam groove of the cam gear is formed in the rotary lever, and, when the spring load is imposed on the rotary lever, this spring load serves as a frictional force added to the cam groove via the sliding pin. As a result, the frictional force becomes a rotational load imposed on the cam gear. Patent reference 1 discloses a technology of, in order to control this rotational load, adjusting the shape of the wall surface of the cam groove to adjust the amount of expansion and contraction of the elastic member, thereby adjusting the frictional force added to the cam groove.

RELATED ART DOCUMENT

Patent Reference

Patent reference 1: JP,11-283311,A

SUMMARY OF THE INVENTION

In the conventional disc device constructed as mentioned above, because the spring load is proportional to the frictional force added to the cam groove, an upper limit of the spring load for ensuring the rotational driving force of the cam gear needs to be set, and a lower limit of the spring load required to make the elastic member exert its spring effect also needs to be set. A problem is therefore that when environmental conditions, such as temperature, are also taken into consideration, the range of the spring load which can guarantee the disc device to operate as usual becomes very narrow, and the degree of flexibility in the design of the disc device is reduced.

The present invention is made in order to solve the above-mentioned problem, and it is therefore an object of the present invention to provide a disc device that carries out operations with stability while reducing a frictional force applied to a cam groove, thereby reducing a rotational load imposed on a cam gear.

In accordance with the present invention, there is provided a disc device including: a rack gear extending in a movement direction of the above-mentioned pickup, and disposed integrally with the above-mentioned pickup; a first partially toothless gear having a cam groove, and engaged with and released from one gear of the above-mentioned power transmission system; a second partially toothless gear having a hole corresponding to the above-mentioned cam groove, laid on the above-mentioned first partially toothless gear and rotatably supported relative to the above-mentioned first partially toothless gear, and engaged with and released from one gear of the above-mentioned power transmission system; a rotary lever having an engagement part which comes into contact with a locking member on the above-mentioned rack gear to press the above-mentioned rack gear toward the movement direction of the above-mentioned pickup at an end thereof, and a pin penetrating through the above-mentioned hole and acting on the above-mentioned cam groove at another end thereof; a trigger member that operates at a time of completion of insertion of the disc so as to make the above-mentioned first partially toothless gear rotate to be engaged with one gear of the above-mentioned power transmission system; an operation member that operates in response to a rotational force of the above-mentioned first partially toothless gear so as to disconnect the above-mentioned power transmission system from a disc conveying roller; a pushing member disposed between the above-mentioned rotary lever and the above-mentioned rack gear, for moving the above-mentioned rack gear by using the engagement part of the above-mentioned rotary lever which is rotated by rotation of the above-mentioned first partially toothless gear so as to engage the above-mentioned rack gear with another gear of the above-mentioned power transmission system, and releasing the engagement of the above-mentioned second partially toothless gear with the one gear of the above-mentioned power transmission system by using the above-mentioned pin; and a protruding portion disposed on the above-mentioned operation member, the protruding portion being brought into contact with an end portion of the above-mentioned rotary lever at an initial position of the above-mentioned operation member before the operation member starts operating, so as to restrict a rotation of the above-mentioned rotary lever in such a way that the above-mentioned pin does not come into contact with a wall surface of the above-mentioned cam groove.

Because the disc device in accordance with the present invention is constructed in such a way as to include the protruding portion disposed on the operation member, the protruding portion being brought into contact with the end portion of the rotary lever at the initial position of the above-mentioned operation member before the operation member starts operating, so as to restrict the rotation of the above-mentioned rotary lever in such a way that the pin does not come into contact with the wall surface of the cam groove, a frictional force applied to the cam groove can be reduced without impairing the function of the cam groove, and therefore a rotational load imposed on the cam gear can be reduced. As a result, the operation of the disc device can be stabilized.

EMBODIMENTS OF THE INVENTION

Hereafter, in order to explain this invention in greater detail, the preferred embodiments of the present invention will be described with reference to the accompanying drawings.

Embodiment 1

Figure 1:
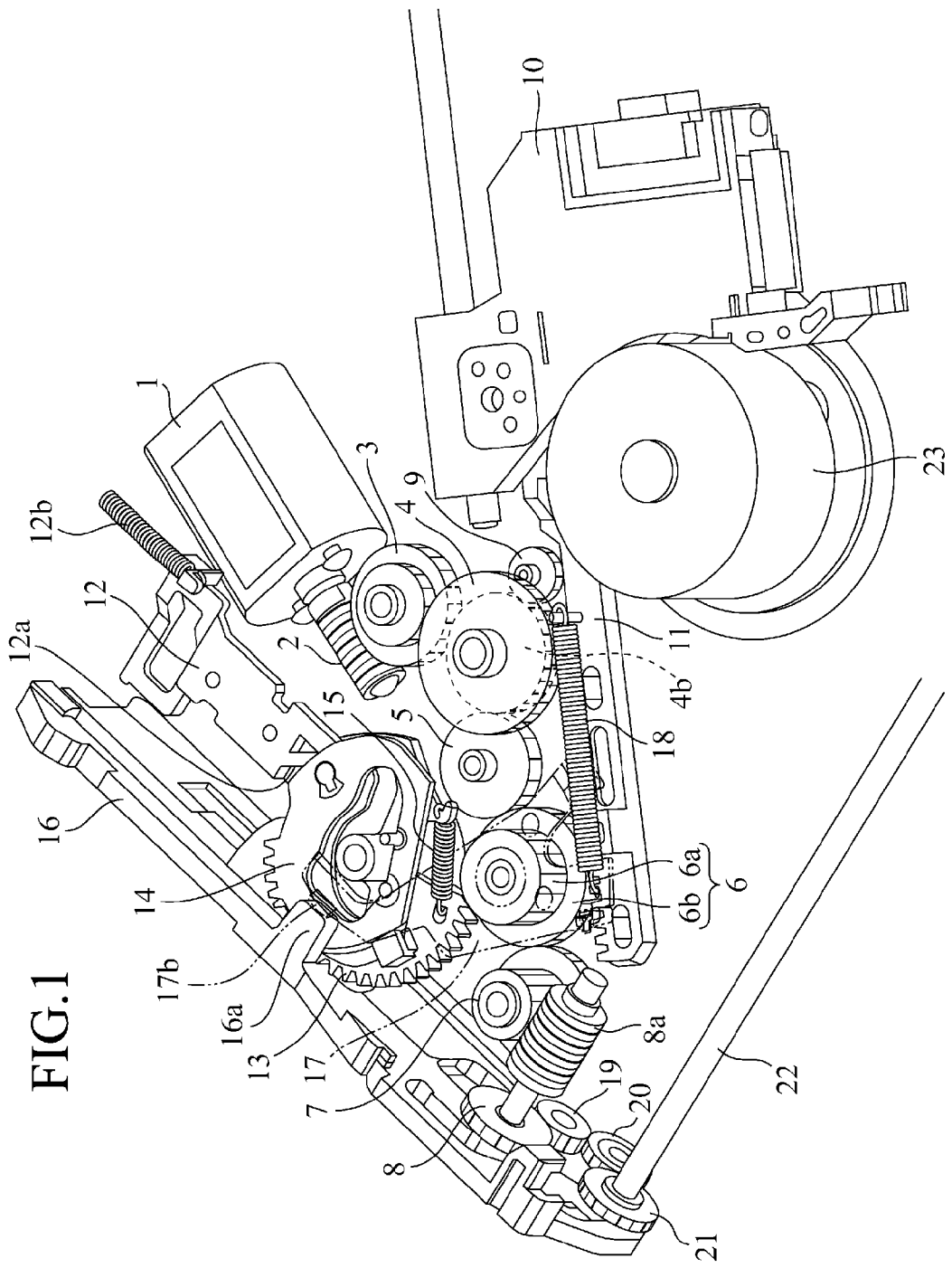
FIG. 1 is a perspective view showing the structure of a disc device in accordance with Embodiment 1.
Figure 2:
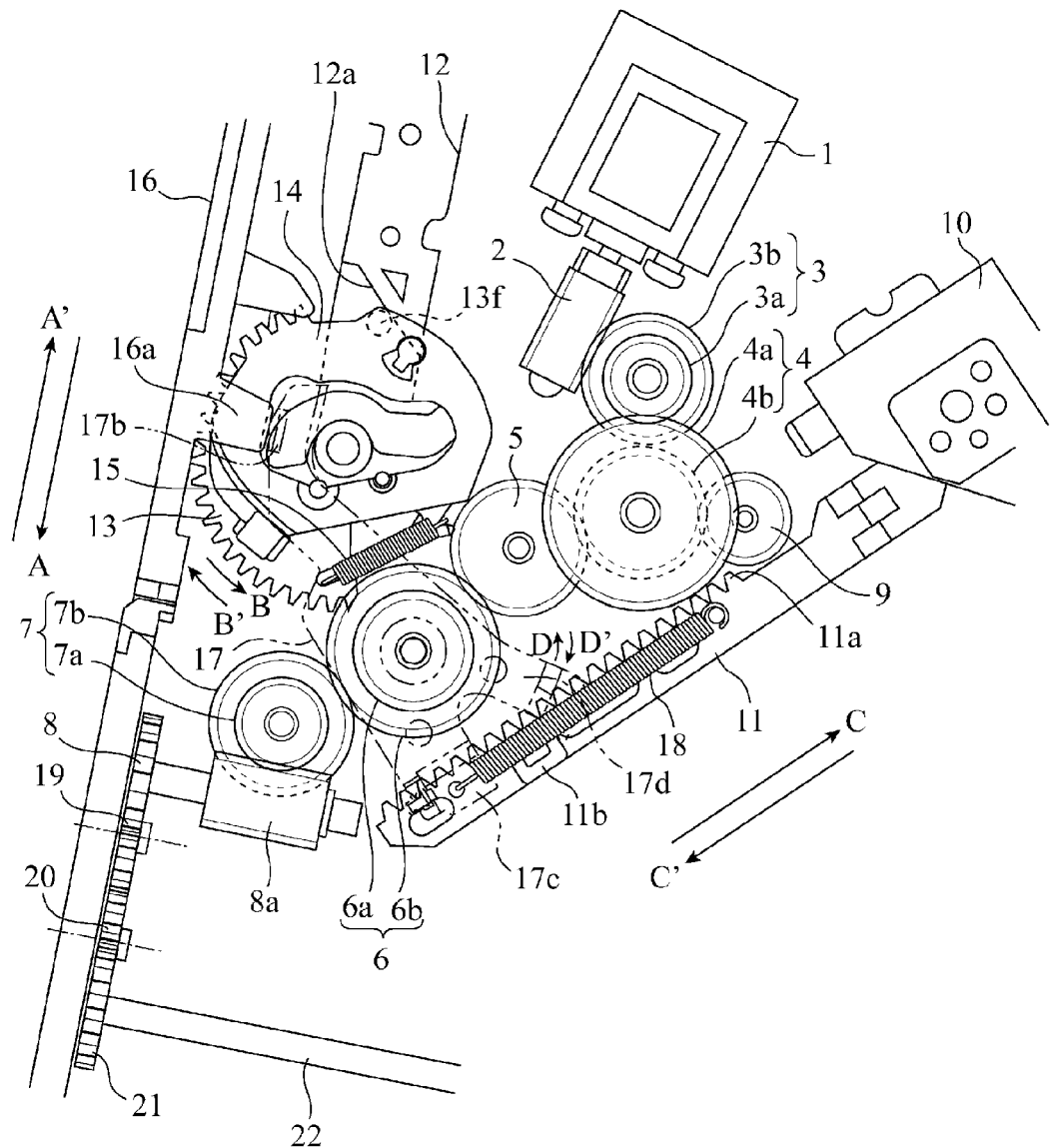
FIG. 2 is a plane view showing the structure of the disc device in accordance with Embodiment 1.

FIG. 1 is a perspective view showing a power switching unit of a disc device in accordance with Embodiment 1, and FIG. 2 is a plane view of the power switching unit. This disc device will be explained hereafter, focusing on disc conveying which is an initial state, mode switching at the time of making a transition from the disc conveying state to a pickup feeding state, and transmitting power in the pickup feeding.

This disc device is provided with main components including a motor 1 which is a driving source, a worm gear 2 attached to the rotatable shaft of the motor 1, a plurality of gears 3 to 9 and 19 to 21 for propagating the rotation of the worm gear 2, a pickup 10 for performing a process of reading an information signal on a disc, a rack gear (a first rack gear) 11 disposed to extend in a movement direction of the pickup 10, a trigger member 12 that operates when detecting an insertion of a disc into the disc device to perform an operation of making a transition to the mode switching of the disc device, a first cam gear (a first partially toothless gear) 13, a second cam gear (a second partially toothless gear) 14, and a rotary lever 17 which are disposed for carrying out the mode switching, a sliding member (an operation member) 16 that moves in synchronization with the mode switching operation, and a turntable 23 for rotating the disc.

Next, the plurality of gears 3 to 9 for propagating the power of the motor 1 will be explained with reference to FIG. 2. The gear 3 is comprised of a small-diameter gear 3a disposed on an upper side thereof, and a large-diameter gear 3b disposed on a lower side thereof, and the large-diameter gear 3b is engaged with the worm gear 2 to rotate. The gear 4 is comprised of a large-diameter gear 4a disposed on an upper side thereof, and a small-diameter gear 4b disposed on a lower side thereof, and the large-diameter gear 4a is engaged with the small-diameter gear 3a to rotate. The gear 5 is engaged with the small-diameter gear 4b to rotate.

The gear 6 is comprised of a small-diameter gear 6a disposed on an upper side thereof, and a large-diameter gear 6b disposed on a lower side thereof, and the large-diameter gear 6b is engaged with the gear 5 to rotate. The gear 7 is comprised of a small-diameter gear 7a disposed on an upper side thereof, and a large-diameter gear 7b disposed on a lower side thereof, and the large-diameter gear 7b is engaged with the large-diameter gear 6b to rotate. The gear 8 has a crossed helical gear 8a at an end of the rotatable shaft thereof, and this crossed helical gear 8a is engaged with the small-diameter gear 7a to rotate. The pinion gear 9 is engaged with the small-diameter gear 4b to rotate.

At the time of disc conveying, the rotation of the gear 8 is propagated to the shaft 22 via the gear 19, the gear 20, and the gear 21, and the disc is conveyed by a conveyance roller (not shown) disposed on this shaft 22. Furthermore, at this time of disc conveying, because the pinion gear 9 is not engaged with a gear part 11a of the rack gear 11, the pinion gear 9 runs at idle. In contrast, at the time of pickup feeding, the engagement between the gear 20 and the gear 21 is released and the gear 20 runs at idle, and the pinion gear 9 is engaged with the gear part 11a of the rack gear 11 and the rack gear 11 moves.

Next, the first cam gear 13, the second cam gear 14, the rotary lever 17, the trigger member 12, and the sliding member 16 which are structural components for carrying out the mode switching will be explained with reference to FIGS. 1 to 3.

Figure 3:
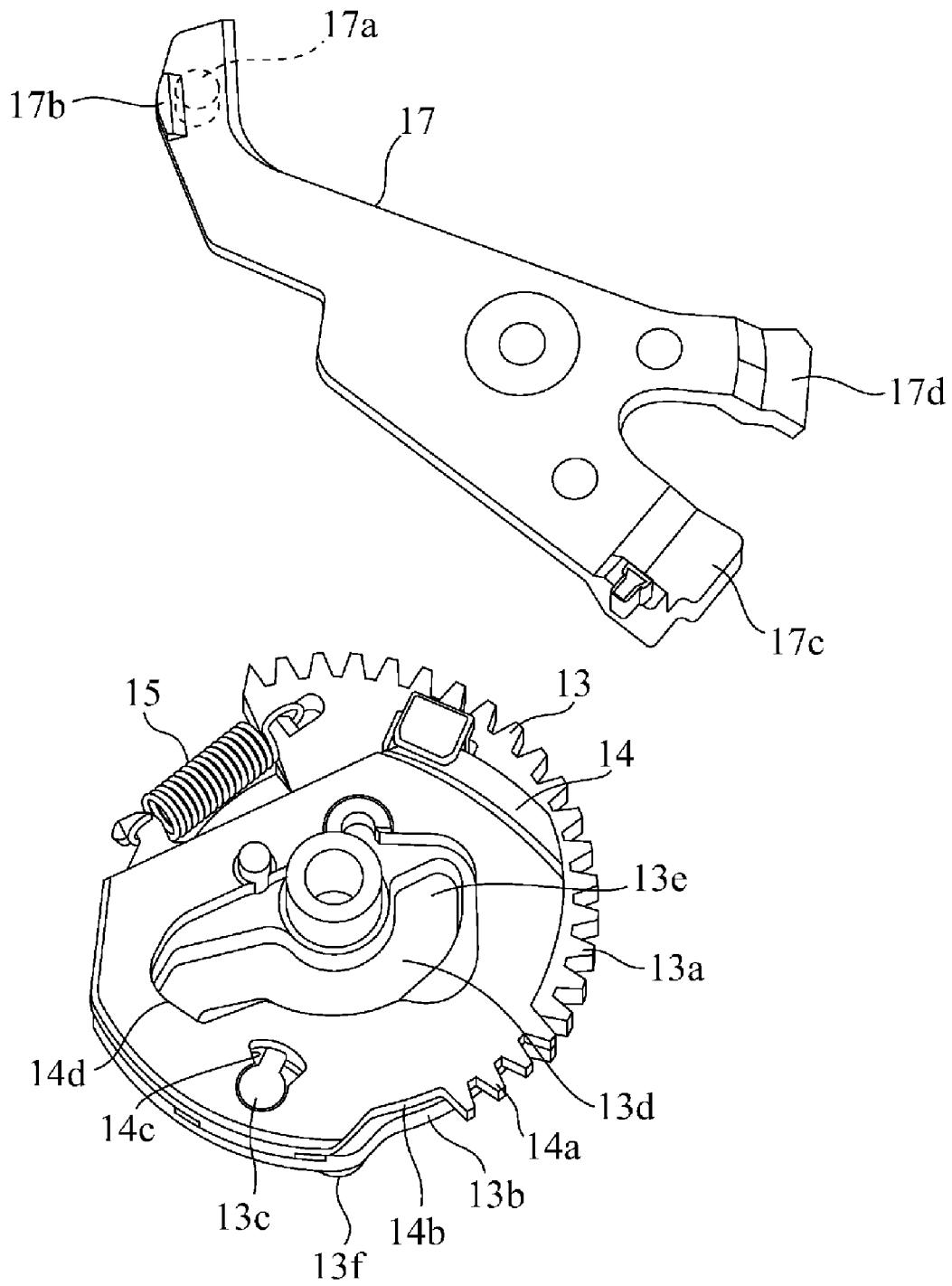
FIG. 3 is a perspective view showing the structure of cam gears and a rotary lever of the disc device in accordance with Embodiment 1.

FIG. 3 is a perspective view showing the structure of the first cam gear, the second cam gear, and the rotary lever of the disc device in accordance with Embodiment 1 of the present invention.

The first cam gear 13 has a gear part 13a and a toothless part 13b in a peripheral portion thereof, and has a protruding portion 13c in a vicinity of the peripheral portion. Furthermore, a cam groove 13d which is a recessed portion which is formed of a combination of a simple arc-shaped recessed part and line-shaped recessed parts is disposed in a central portion of the first cam gear 13. The cam groove 13d has a release region 13e formed in an end portion thereof, the release region having a groove width which is wider than those of the other groove parts, and this release region 13e is formed in such a way that its groove width is slightly wider than the diameter of a pin 17a of the rotary lever 17 which will be mentioned below. In addition, a pin 13f that is brought into contact with the trigger member 12 is formed on a rear surface of the first cam gear 13.

The second cam gear 14 has a gear part 14a and a toothless part 14b in a peripheral portion thereof, and has a fitting hole 14c into which the protruding portion 13c of the first cam gear 13 can be fitted in a vicinity of the peripheral portion. Furthermore, a hole portion (a hole) 14d corresponding to the cam groove 13d is formed in a central portion of the second cam gear 14. By inserting the protruding portion 13c into the fitting hole 14c, and laying a spring 15 between the first cam gear 13 and the second cam gear 14 in a tensioned state, the first cam gear 13 and the second cam gear 14 are assembled into an integral piece. At the time of assembling the first and second cam gears into an integral piece, these cam gears are arranged in such away that the last tooth of the gear part 13a and the first tooth of the gear part 14a lie on top of each other, and the gear parts 13a and 14a are running in series.

The spring 15 causes the first cam gear 13 and the second cam gear 14 to be pressed against each other, so that the two cam gears can rotate as an integral piece. Because the force for engaging the second cam gear 14 with the gear 6 is acquired from the spring 15, even when contact at the tips of gear teeth occurs in the gear part 14a at the time of engagement between the second cam gear 14 and the gear 6, the second cam gear 14 can be flipped (released) in response to the pushing force of the spring 15, and therefore the second cam gear 14 can be prevented from entering a mechanically locked state.

The rotary lever 17 has the pin 17a penetrating through the hole portion 14d and acting on the cam groove 13d at a tip part thereof, and this pin 17a penetrates through the hole 14d to act on the cam groove 13d. As shown in FIGS. 1 and 2, a protruding portion 16a protruding from the sliding member 16 is brought into contact with a rising portion 17b disposed in the vicinity of this pin 17a in the disc conveying state (the initial state). Because the protruding portion 16a is in contact with the rising portion to support the rotary lever 17, when the first cam gear 13 and the second cam gear 14 start rotating, only the cam groove 13d can be moved with the pin 17a being held in the initial state and the pin 17a can be positioned at the center of the release region 13e. As a result, the pin 17a can be prevented from coming into contact with the wall surface of the cam groove 13d, and the frictional force between them can be reduced to zero. In other words, the rotational load imposed on the first cam gear 13 can be reduced.

Furthermore, bifurcated legs (an engagement part) 17c and 17d are formed at the other end of the rotary lever 17. As shown in FIGS. 1 and 2, the legs 17c and 17d are arranged in such a way as to sandwich a locking portion (a locking member) 11b formed in the rack gear 11 from both sides of the locking portion, and the rotary lever 17 is always pushed toward a direction of an arrow D by the spring 18 extended between the leg 17c and the rack gear 11. The center of rotation of the rotary lever 17 exists on the rotation center axis of the gear 6, and the rotary lever 17 rotates about this center of rotation in directions of arrows D and D' in response to the pushing force of the spring 18 and a movement of the pin 17*a* in the cam groove 13*d*.

The trigger member 12 moves in a direction of an arrow A at the time of the completion of insertion of a disc into the disc device to rotate the first cam gear 13 in a direction of an arrow B via the pin 13*f* in contact with a cam face 12*a* and engage the first cam gear 13 with the gear 6. The sliding member 16 is engaged with the first cam gear 13 and the second cam gear 14 at the time of mode switching, and moves in directions of arrows A and A'. The sliding member 16 has the protruding portion 16*a* which comes into contact with the rising portion 17*b* of the rotary lever 17. Furthermore, the sliding member 16 is attached to a base member (not shown) to which the gears 3 to 9 are attached, together with the gear 8, the gear 19, the gear 20, the gear 21, and the shaft 22.

Next, the operation of the disc device will be explained with reference to FIGS. 1 and 6.

Figure 4:
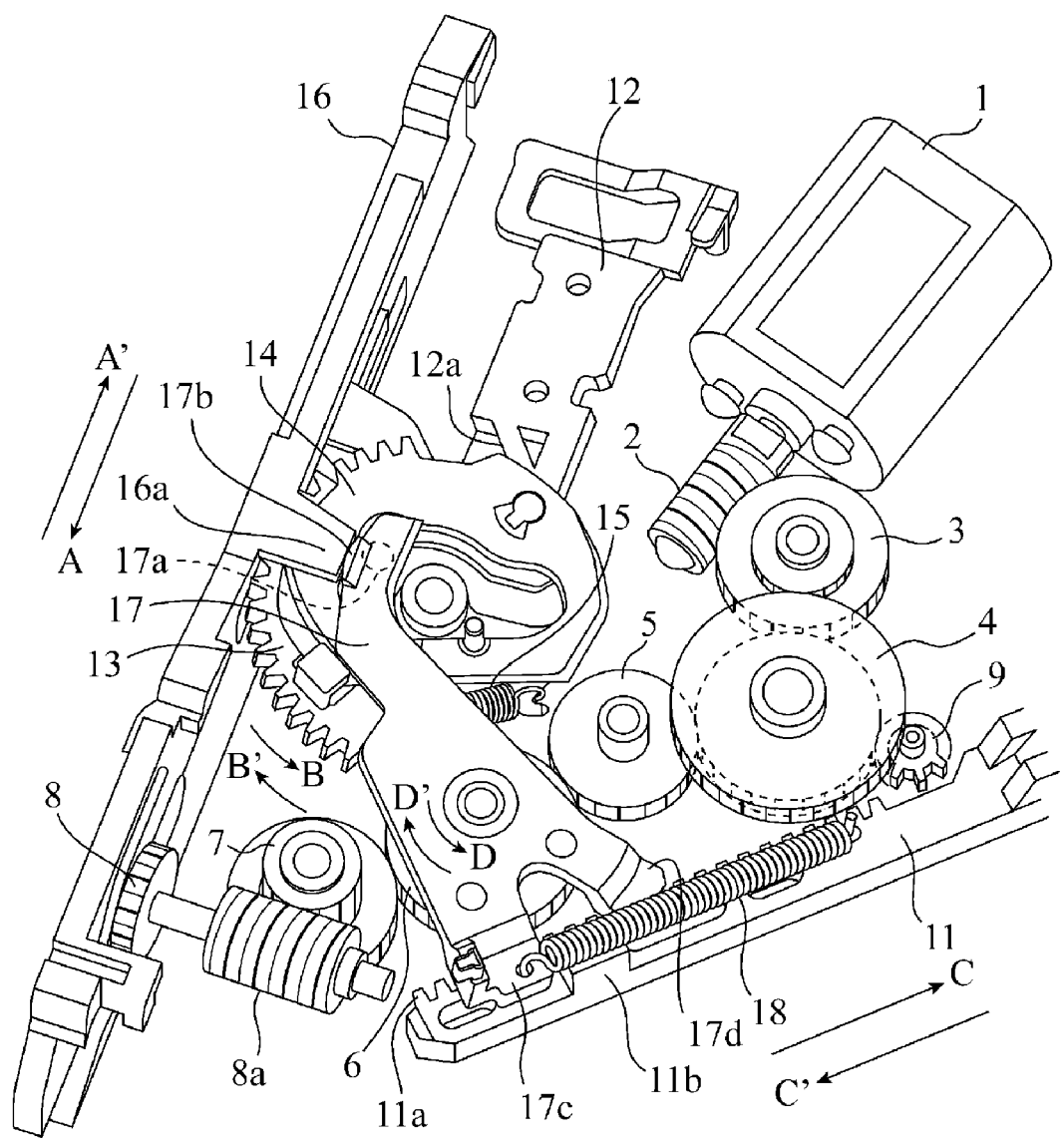
FIG. 4 is a perspective view showing an operating state of the disc device in accordance with Embodiment 1 at the time of disc conveying.
Figure 5:
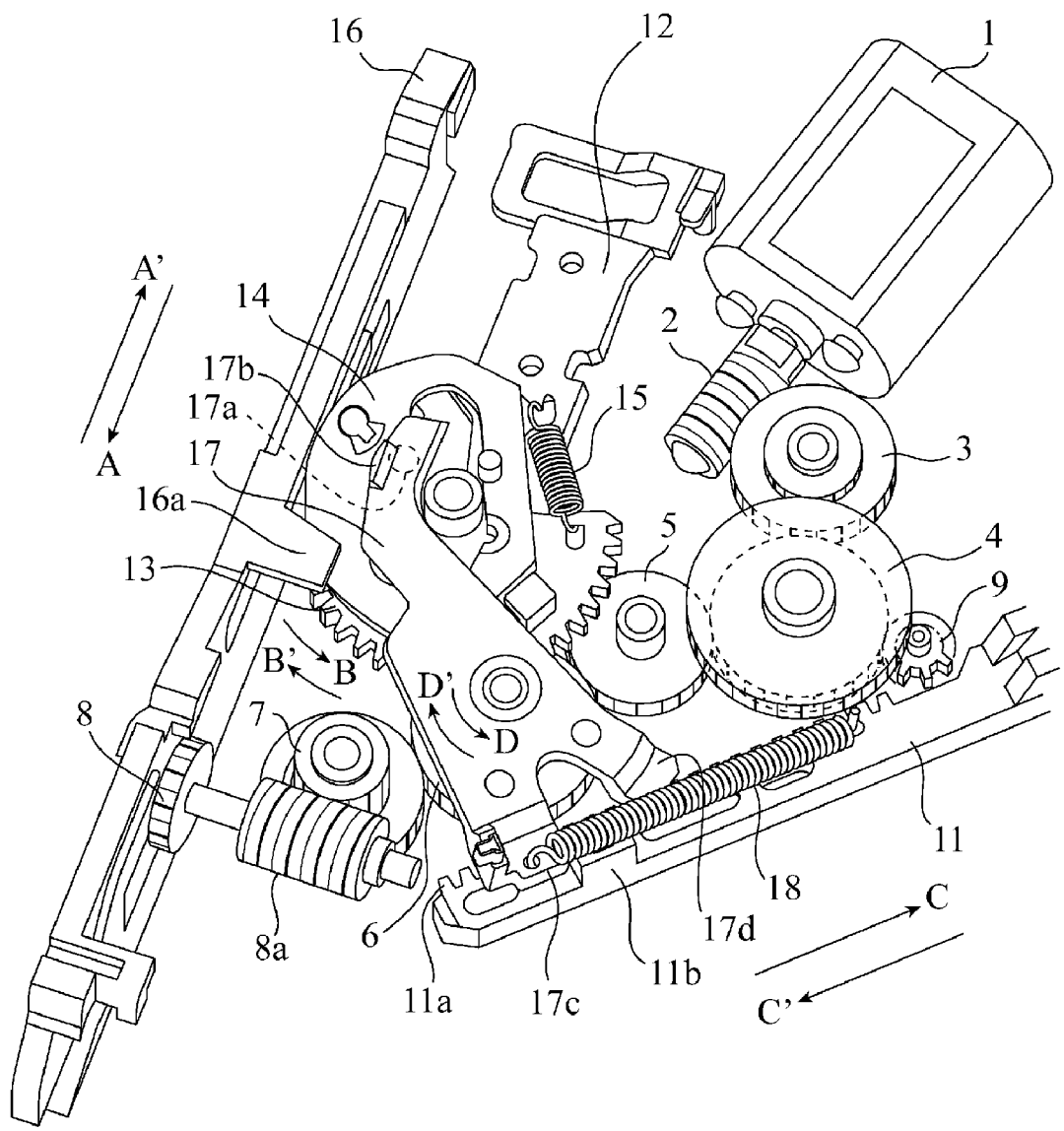
FIG. 5 is a perspective view showing an operating state of the disc device in accordance with Embodiment 1 at the time of mode switching.
Figure 6:
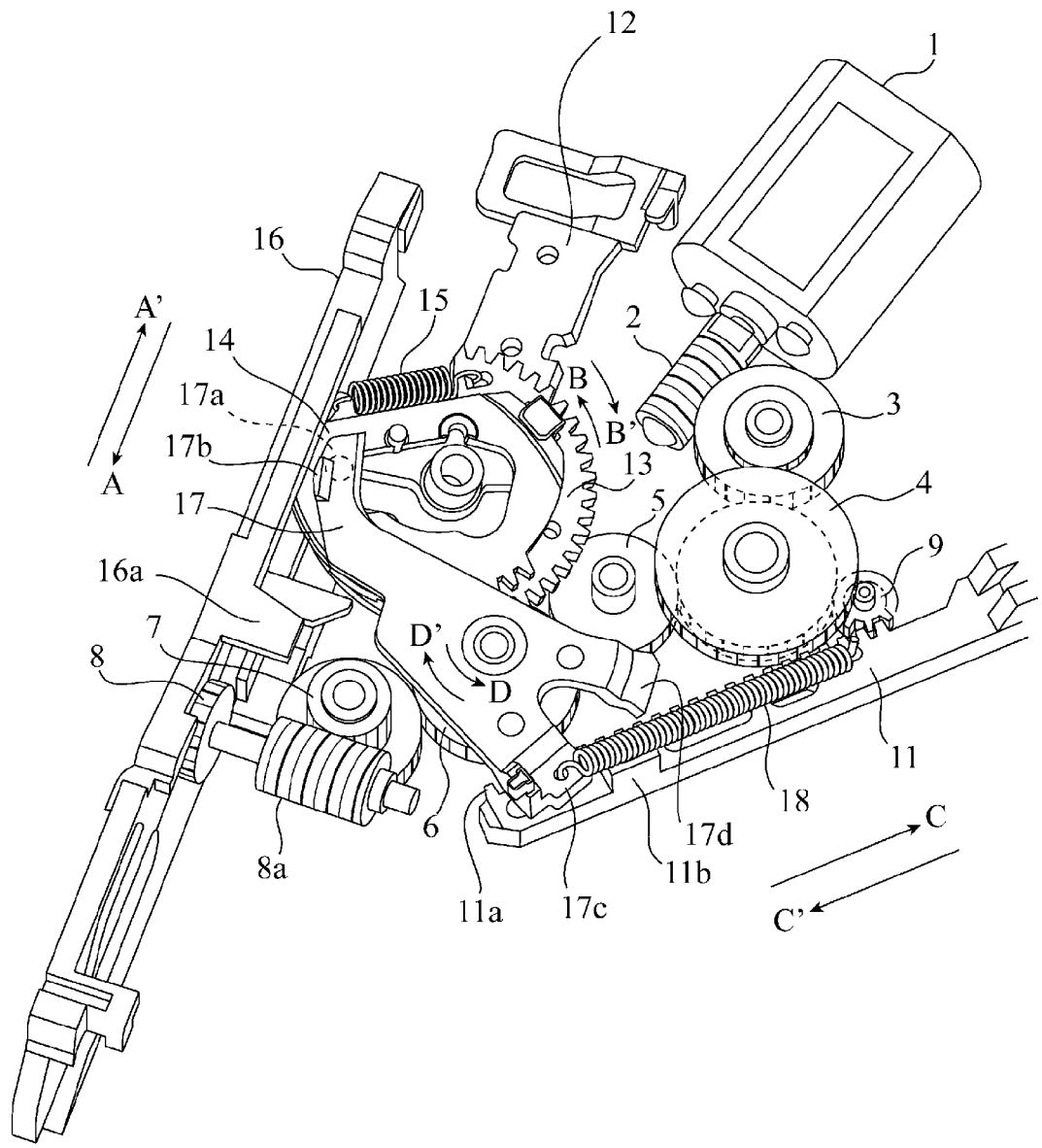
FIG. 6 is a perspective view showing an operating state of the disc device in accordance with Embodiment 1 at the time of pickup feeding.

FIGS. 4 to 6 are perspective views showing operating states of the disc device in accordance with this Embodiment 1, FIG. 4 shows an operating state at the time of disc conveying, FIG. 5 shows an operating state at the time of mode switching, and FIG. 6 shows an operating state at the time of pickup feeding.

In all the operating states, the driving force of the motor 1 is propagated to the gear 6. In this state, at the time of disc conveying shown in FIG. 4, the driving force is propagated to the shaft 22 via the gear 7 engaged with the gear 6, and the other gears 8, 19, 20, and 21. The shaft 22 rotates in response to this driving force, and the conveyance roller (not shown) disposed on this shaft 22 then inserts the disc into the disc device. At this time of disc conveying, the gear part 13*a* of the first cam gear 13 is not engaged with the gear 6, and the pinion gear 9 is not engaged with the gear part 11*a* of the rack gear 11, either. Furthermore, the protruding portion 16*a* of the sliding member 16 is in contact with the rising portion 17*b* of the rotary lever 17. Therefore, the pin 17*a* is not in contact with the wall surface of the cam groove 13*d*.

After the insertion of the disc is completed, the trigger member 12 starts moving in the direction of the arrow A. As the trigger member 12 moves in the direction of the arrow A, the pin 13*f* of the first cam gear 13 moves along the cam face 12*a* with the pin being pushed against the cam face, and the whole first cam gear 13 starts rotating in the direction of the arrow B. The trigger member 12 pushes and rotates the first cam gear 13 up to a position at which the gear part 13*a* of the first cam gear 13 starts engagement with the gear 6. At this time, the second cam gear 14 also rotates in the direction of the arrow B integrally with the first cam gear.

Although the sliding member 16 starts sliding in the direction of the arrow A as the first cam gear 13 and the second cam gear 14 rotate, the contact of the protruding portion 16*a* with the rising portion 17*b* of the rotary lever 17 is maintained during the rotation of the first cam gear 13 which is caused by the trigger member 12. As a result, while the first cam gear 13 is rotated up to the position at which the gear part 13*a* of the first cam gear 13 starts engagement with the gear 6, the rotary lever 17 is supported by the sliding member 16 and the rotation of the rotary lever in the direction of the arrow D is prevented.

In case that the rotary lever 17 is not supported by the sliding member 16, like in a conventional case, a large rotational load is imposed on the first cam gear 13 due to the frictional force resulting from the contact of the pin 17*a* with the wall of the cam groove 13*d*. Therefore, it becomes difficult to make the first cam gear 13 operate stably with the small force caused by the trigger member 12.

In contrast, because in the disc device in accordance with this Embodiment 1, the release region 13*e* is disposed in the cam groove 13*d*, and the protruding portion 16*a* of the sliding member 16 is brought into contact with the rising portion 17*b* of the rotary lever 17 to support the rotary lever 17, the pin 17*a* can be held at the center portion of the release region 13*e*, and the pin 17*a* can be prevented from coming into contact with the wall of the cam groove 13*d*. As a result, the occurrence of a frictional force between the pin and the cam groove can be prevented and the rotational load imposed on the first cam gear 13 can be reduced.

On the other hand, the gear 21 moves as the sliding member 16 moves in the direction of the arrow A to release the engagement between the gear 20 and the gear 21 and stop the propagation of the driving force of the motor 1 to the shaft 22.

Next, the operation of the disc device at the time of mode switching (at the time of rotation of the first cam gear 13) will be explained with reference to FIG. 5.

When the first cam gear 13 is pushed and rotated by the trigger member 12 and the tip of the gear part 13*a* starts engagement with the gear 6, the first cam gear 13 acquires the driving force of the motor 1 from this gear 6 to continue rotating. When the first cam gear 13 thus rotates up to the position at which the gear part 13*a* and the gear 6 are engaged with each other, a retreat of the sliding member 16 advances in the direction of the arrow A and the contact of the protruding portion 16*a* with the rising portion 17*b* of the rotary lever 17 is then released.

At the same time when this contact is released, the rotary lever 17 starts rotating in the direction of the arrow D in response to the pushing force of the spring 18, and the contact with the pin 17*a* is transferred from the protruding portion 16*a* of the sliding member 16 to the cam groove 13*d* of the first cam gear 13. At this time when the contact with the pin is transferred, the region of the cam groove 13*d* having an original groove width which is narrower than the wide groove width of the release region 13*e* can smoothly accept the transfer of the pin 17*a* thereto. Furthermore, because the rotational driving force of the first cam gear 13 engaged with the gear 6 becomes large, even if the transfer of the rotary lever 17 imposes a rotational load on the cam groove 13*d*, the influence of the rotational load on the rotational driving force is small. After the transfer of the rotary lever 17, the first cam gear 13 and the second cam gear 14 further rotate in the direction of the arrow B, and the rotary lever 17 transferred to the first cam gear 13 is pushed toward the direction of the arrow D by the tension of the spring 18 and the pin 17*a* therefore moves in the cam groove 13*d*.

Next, the pickup feeding operation will be explained with reference to FIG. 6.

When the first cam gear 13 and the second cam gear 14 rotate about a half turn after starting engagement with the gear 6, the toothless part 13*b* of the first cam gear 13 moves to a position at which the toothless part faces the gear 6 and the engagement between the first cam gear 13 and the gear 6 is released. At this time, the gear part 14*a* of the second cam gear 14 moves to a position at which the gear part faces the gear 6 and can be engaged with the gear, though the gear part 14*a* moves more inwardly than the toothless part 13*b* around the protruding unit 13*c* serving as an axis in response to the rotational force in the direction of the arrow D of the rotary lever 17, and the engagement of the gear part with the gear 6 is released. After the engagement of the gear part with the gear 6 is released, the propagation of the driving force of the motor 1 to the first cam gear 13 and the second cam gear 14 is stopped, and the rotation of them in the direction of the arrow B is stopped.

When contact at the tips of gear teeth occurs in the gear part 14a at the time of engagement between the second cam gear 14 and the gear 6, a release of the second cam gear 14 using the pushing force of the spring 15 can prevent the second cam gear from entering a mechanically locked state.

On the other hand, when rotating in the direction of the arrow D, the rotary lever 17 pushes the locking portion 11b of the rack gear 11 in the direction of the arrow C by using the leg 17c. When this pushing in the direction of the arrow C moves the above-mentioned first and second cam gears 13 and 14 to a position at which the engagement of them with the gear 6 is released, the gear part 11a of the rack gear 11 moves to a position at which the gear part is engaged with the pinion gear 9. As a result, the driving force of the motor 1 is propagated to the rack gear 11 via the pinion gear 9, and the pickup 10 moves in the direction of the arrow C, together with the rack gear 11, to read the disc.

Next, an operation, which is reverse to the above-mentioned operation, in a case in which the motor 1 rotates in the reverse direction will be explained. The rack gear 11 moves in the direction of the arrow C' in response to the driving force of the motor 1 which is propagated thereto via the pinion gear 9, and the locking portion 11b pushes the leg 17c of the rotary lever 17 toward the direction of the arrow C'. While the rotary lever 17 starts rotating in the direction of the arrow D' and the pin 17a moves in the cam groove 13d, the gear part 14a of the second cam gear 14 moves to a position at which the gear part faces the outer circumference of the gear part 13a of the first cam gear 13 in response to the pushing force of the spring 15 and is engaged with the gear 6, and then starts rotating in the direction of the arrow B'. After that, the first cam gear 13 is engaged with the gear 6, too, and rotates in the direction of the arrow B'.

While the sliding member 16 slides in the direction of the arrow A' as the first cam gear 13 and the second cam gear 14 rotate in the direction of the arrow B', the rising portion 17b of the rotary lever 17 in which the pin 17a has been moving in the cam groove 13d of the first cam gear 13 comes into contact with the protruding portion 16a of the sliding member 16 and is then supported by the protruding portion. While the engagement of the first cam gear 13 with the gear 6 is released by this rotation, the trigger member 12 moves in the direction of the arrow A' in response to the tension of the spring 12b attached to the trigger member 12. After the rotation of this first cam gear 13 is completed, the sliding of the sliding member 16 in the direction of the arrow A' is also ended, the gear 21 is engaged with the gear 20, and the driving force of the motor 1 is propagated to the shaft 22 via the gear 21. As a result, the conveyance roller disposed on the shaft 22 rotates in the reverse direction, and an operation of ejecting the disc is carried out.

As mentioned above, because the disc device in accordance with this Embodiment 1 is constructed in such a way that the release region 13e having a wide groove width is formed in an end portion of the cam groove 13d, and the protruding portion 16a is disposed in the sliding member 16 and is brought into contact with the rising portion 17b of the rotary lever 17 to support the rotary lever, the pin 17a of the rotary lever 17 can be positioned at the center of the release region 13e and the pin 17a can be prevented from coming into contact with the wall of the cam groove 13d when the first cam gear 13 starts rotating. As a result, the frictional force applied to the first cam gear 13 at the time when the first cam gear starts rotating with a small rotational driving force can be reduced, and therefore the rotational load can be reduced. Furthermore, the rotational load can be reduced without changing the position of the rotary lever 17.

In addition, because the disc device in accordance with this Embodiment 1 is constructed in such away that at the time when the rotational driving force is small, like at the time when the first cam gear 13 starts rotating, the sliding member 16 releases the rotary lever 17 in the cam groove 13d, and this rotary lever 17 moves within the cam groove 13d in response to the first cam gear 13 and the pushing force of the spring 18, the disc device can implement its stable operations without impairing the original function of the cam groove.

Furthermore, because the disc device in accordance with this Embodiment 1 is constructed in such a way that in a state in which the rotational driving force is small, the sliding member 16 supports the rotary lever 17, and in a state in which the rotational driving force is large, the first cam gear 13 accepts the rotary lever 17, the rotational load can be prevented from being applied to the first cam gear 13 in the state in which the rotational driving force is small, while the rotational load can be controlled to be imposed on the first cam gear 13 after the disc device makes a transition to the state in which the rotational driving force is large.

In addition, because the disc device in accordance with this Embodiment 1 is constructed in such a way that the sliding member 16 rotates in synchronization with the rotation of the first cam gear 13, the transfer of the rotary lever 17 from the sliding member 16 to the first cam gear 13 can be carried out smoothly.

In addition, because the disc device in accordance with this Embodiment 1 is constructed in such a way that the portion in which the release region 13e is disposed is limited to a fixed range, the groove width of the cam groove 13d is reduced to its original width and therefore a smooth transfer of the rotary lever 17 can be implemented before the protruding portion 16a is retreated from the rising portion 17b of the rotary lever 17.

In the structure in accordance with above-mentioned Embodiment 1, the leg 17d of the rotary lever 17 has the function of preventing a mechanical mode displacement from occurring in the disc device. In a state in which no disc is inserted into the disc device, the rack gear 11 is not connected to the pinion gear 9 and hence the driving force of the motor 1 is not propagated to the rack gear. However, when a shock is applied to the disc device due to a fall of the disc device, vibrations, or the like in this state, there is a possibility that the rack gear 11 moves and is connected to the pinion gear 9, the disc device makes a transition to the pickup feeding operation, and this causes occurrence of a mechanical mode displacement. Although a structure of disposing a locking means in order to prevent this occurrence of a mechanical mode displacement has been known conventionally, the disc device in accordance with this Embodiment 1 is constructed in such away that the leg 17d functions as such a locking means.

More specifically, in the state in which the rack gear 11 is not engaged with the pinion gear 9, as shown in FIG. 4, the leg 17d is brought into contact with the locking portion 11b so as to prevent the rack gear 11 from further moving in the direction of the arrow C. In contrast, in the state in which the insertion of a disc is completed and the rack gear 11 is engaged with the pinion gear 9, as shown in FIG. 6, the leg 17d is retreated from the path of the rack gear 11 in such a way as not to obstruct the movement of the rack gear 11. Because the disc device can thus prevent the occurrence of a mechanical mode displacement without disposing any new locking means, the cost of the disc device can be reduced while the structure of the disc device can be simplified.

INDUSTRIAL APPLICABILITY

Because the disc device in accordance with the present invention is constructed in such a way as to include the protruding portion disposed on the operation member, the protruding portion being brought into contact with the end portion of the rotary lever at the initial position of the above-mentioned operation member before the operation member starts operating, so as to restrict the rotation of the above-mentioned rotary lever in such a way that the pin does not come into contact with the wall surface of the cam groove, a frictional force applied to the cam groove can be reduced without impairing the function of the cam groove, and therefore a rotational load imposed on the cam gear can be reduced. As a result, the operation of the disc device can be stabilized.

Therefore, the disc device in accordance with the present invention is suitable for use as a disc device that carries out disc conveying and pickup feeding by using a single source of power, and so on.

The invention claimed is:

1. A disc device that changes a power transmission system using a single driving source so as to carry out either of conveying of a disc and feeding of a pickup, said disc device comprising:
   a rack gear extending in a movement direction of said pickup, and disposed integrally with said pickup;
   a first partially toothless gear having a cam groove, and engaged with and released from a first gear of said power transmission system; a second partially toothless gear having a hole corresponding to the above-mentioned cam groove, laid on the said first partially toothless gear and rotatably supported relative to said first partially toothless gear, and engaged with and released from said first gear of said power transmission system;
   a rotary lever having an engagement part at a first end portion which comes into contact with a locking member on said rack gear to press said rack gear toward the movement direction of said pickup, and at a second end portion a pin penetrating through said hole and acting on said cam groove;
   a trigger member that operates at a time of completion of insertion of the disc so as to make said first partially toothless gear rotate to be engaged with said first gear of said power transmission system;
   an operation member that operates in response to a rotational force of said first partially toothless gear so as to disconnect said power transmission system from a disc conveying roller; and
   a pushing member disposed between said rotary lever and said rack gear, for moving said rack gear by using the engagement part of said rotary lever which is rotated by rotation of said first partially toothless gear so as to engage said rack gear with a second gear of said power transmission system, and releasing the engagement of said second partially toothless gear with said first gear of said power transmission system by using said pin; and
   a protruding portion disposed on said operation member, the protruding portion being brought into contact with said second end portion of said rotary lever at an initial position of said operation member before the operation member starts operating, so as to restrict a rotation of said rotary lever in such a way that said pin does not come into contact with a wall surface of said cam groove.

2. The disc device according to claim 1, wherein the cam groove has a release region having a wide groove width in an end portion of said cam groove.

* * * * *